W. Evans,
Wind Wheel,
N° 1,239. Patented July 12, 1839.
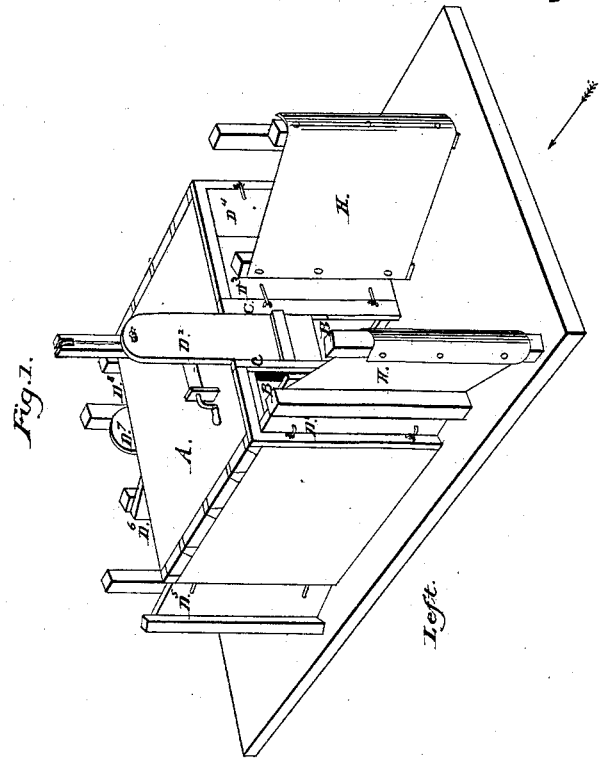
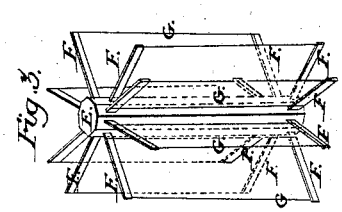
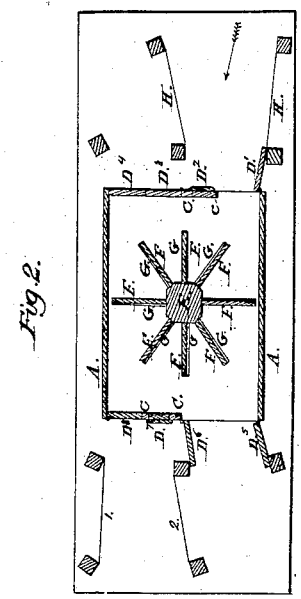

UNITED STATES PATENT OFFICE.

WANTSFORD EVANS, OF NEAR DUMFRIES, VIRGINIA.

IMPROVEMENT IN WINDMILLS.

Specification forming part of Letters Patent No. 1,239, dated July 12, 1839.

*To all whom it may concern:*

Be it known that I, WANTSFORD EVANS, of near Dumfries, in the county of Prince William and State of Virginia, have invented a new and useful Improvement in Windmills, which is described as follows, reference being had to the annexed drawings of the same, making part of this specification.

Figure 1 is a perspective view of the windmill. Fig. 2 is a horizontal view or plan; Fig. 3, the wheel.

The building A, in which the wheel B turns, is constructed about thirty feet square, closed at the sides, top, and bottom. The ends are left open, except where they are closed by upright pieces C, against which doors D shut, by which the ends may be wholly or partly closed, as required. The revolving windwheel B turns horizontally in said building. It is about twenty-eight feet in diameter, and consists of a vertical polygonal shaft E, turning in the center of said building, from whose sides radiate arms F of about thirteen feet in length, to which the sails G, Fig. 3, are attached. The power sought is derived from the wind in turning this wheel, and is applied to the propelling of mills, &c., directly from the shaft or through the agency of suitable gearing attached thereto. The wind is directed to the wheel by means of guides or wings H, placed in front of the doors, one flaring to the right and the other to the left. When the wind blows in the direction of the arrow, these wings are arranged as represented in the drawings; but when the wind blows in an opposite direction, said wings must be placed at the opposite end of the building on the lines marked 1 and 2. Six of the doors $D'$ $D^3$ $D^4$ $D^5$ $D^6$ $D^8$ are hinged and turn horizontally, and two doors $D^2$ $D^7$ slide vertically in grooves and are raised by windlasses or otherwise. If the wind blows moderately, the doors $D^3 D^4$ must be closed and the doors $D'$ $D^2$ $D^5$ $D^6$ opened; but should the wind blow very strongly the door $D^2$ must be closed, and when it is desired to stop the motion of the wheel the four doors at one end must be closed, and when the wind blows from the opposite direction the doors on the right side of the house must be opened and the doors on the left side must be closed and the wings H arranged on the lines 1 and 2, as before mentioned. The wind in passing through the side of the house where the doors are open strikes the sails of the wheel and turns it in the direction of the current of air through the building.

The invention claimed, and desired to be secured by Letters Patent, consists in—

The arrangement of the wings H and doors D for directing and regulating the current of air, as described.

WANTSFORD EVANS.

Witnesses:
WM. P. ELLIOT,
WILLIAM PESKY.